D. H. ZUCK.
ANIMAL POKE.
APPLICATION FILED JAN. 13, 1912.

1,060,054.

Patented Apr. 29, 1913.

Witnesses
M. H. LoRee
M. P. Williamson

Inventor
D. H. Zuck
By H. H. Williamson
Attorney

UNITED STATES PATENT OFFICE.

DAVID H. ZUCK, OF FIRSTVIEW, COLORADO.

ANIMAL-POKE.

1,060,054.  Specification of Letters Patent.  Patented Apr. 29, 1913.

Application filed January 13, 1912. Serial No. 671,093.

*To all whom it may concern:*

Be it known that I, DAVID H. ZUCK, a citizen of the United States, residing at Firstview, in the county of Cheyenne and State of Colorado, have invented a certain new and useful Improvement in Animal-Pokes, of which the following is a specification.

My invention relates to new and useful improvements in animal pokes, and has for its object to provide an exceedingly simple and effective device of this character which is adapted to be fastened into the hide of the animal, preferably upon the neck well back toward the shoulders.

My improved poke is especially adapted to prevent animals from creeping through wire fences.

A further object of the invention is to produce an animal poke which will be inexpensive in cost to manufacture, which will be made of one piece and one which will be light in weight, yet strong and durable.

When an animal endeavors to creep through a wire fence its head is placed between two strands of wire, the lower strand being placed downward, while the upper strand slides along the back of the animal, and this upper strand comes in contact with my improved poke and as the animal moves forward the poke is held back by the strand of wire causing the fastening means to pain the animal, at which time the animal will withdraw to relieve the pain.

With these ends in view, this invention consists in the details of construction and combination of elements hereinafter set forth and specifically designated by the claim.

In order that those skilled in the art to which this invention appertains may understand how to make and use same, I will describe its construction in detail, referring by letter to the accompanying drawing forming a part of this specification, in which:—

Figure 1:
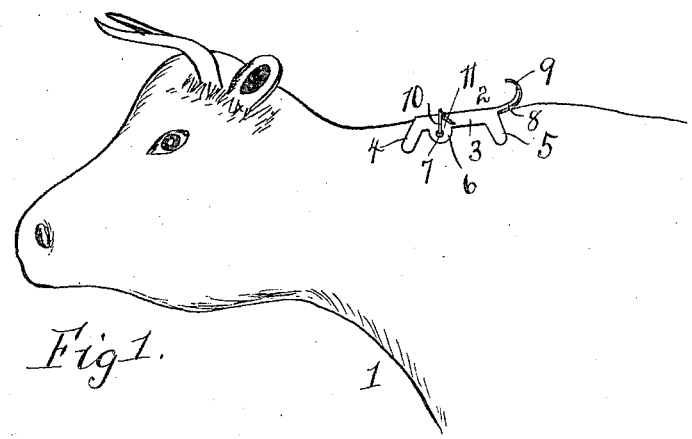
Figure 2:
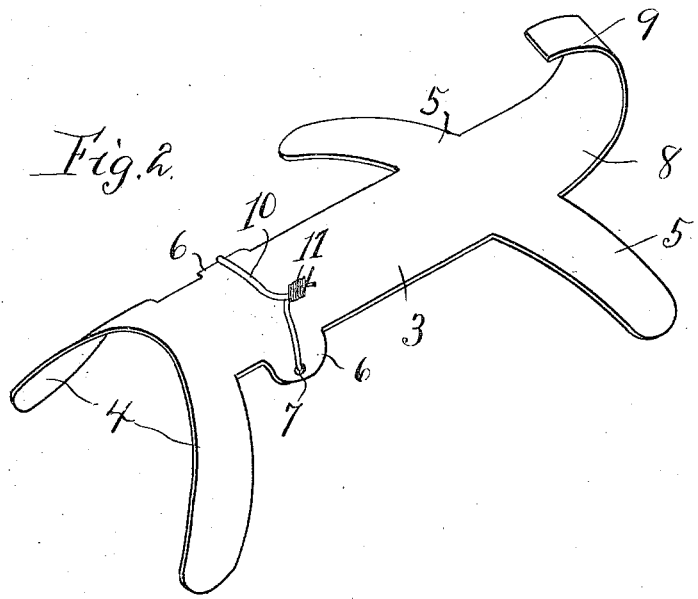

Figure 1 is a side elevation of the head and neck of an animal, showing my improved animal poke applied thereto, and Fig. 2, a detailed perspective view of the animal poke.

In carrying out my invention as here embodied, (1) represents an animal to which the poke is to be fastened.

(2) denotes the poke comprising a body 3 having a pair of integral oppositely disposed arms 4 which with the body assume the contour of the animal's neck to which it is fastened, one of said arms resting upon each side of the neck, at the rear end of the body are formed a pair of oppositely disposed legs 5 which like arms 4 assume the contour of the animal's neck and rest upon each side thereof. Both the arms and legs preferably diverge from one another toward their free ends, so that the arms slant forward, while the legs slant backward. Intermediate the arms and legs from each edge of the body are produced the oppositely disposed lugs 6 each of said lugs being provided with a perforation 7. The rear end of the body terminates in a tail 8 which is bent forward and backward over the body to produce a hook 9, said hook adapted to engage a wire strand of a fence should the animal to which the poke is fastened endeavor to creep through the fence.

The poke is placed upon the animal's neck in proximity to the shoulders, with the tail or hook toward the animal's tail so that the open portion of the hook faces the head of the animal. A sterilized wire 10 is then inserted in the perforation 7 in one of the lugs 6, then forced through the skin or hide of the animal, or the hide may be perforated for the insertion of said wire, and after the end has passed through the hide it is then placed through the perforation of the opposite lug, and the ends of the wire carried over the body of the poke and fastened in some suitable manner as shown at 11.

In practice a creeping animal inserts its head between the strands of a wire fence and endeavors to mash the lower strands down while the upper strand of wire is allowed to slide along the back, but by the use of my improved poke the upper strand will be engaged by the hook 9 causing the wire 10 to pain the animal, and to relieve the pain the animal will draw back thus making it stay in its pasture.

Of course I do not wish to be limited to the exact details of construction as here shown, as these may be varied within the limits of the appended claim without departing from the spirit of my invention.

Having thus fully described my invention, what I claim as new and useful, is—

An animal poke comprising a body terminating in a hook, a pair of integrally oppositely disposed arms produced from the forward end of the body, a pair of integrally oppositely disposed legs formed from the rear end of the body, a pair of oppositely disposed lugs formed from the body intermediate the arms and legs, each of said lugs having a perforation therein and a wire passing through the perforations in the lugs and through the hide of the animal the ends of said wire being fastened together.

In testimony whereof, I have hereunto affixed my signature in the presence of two subscribing witnesses.

DAVID H. ZUCK.

Witnesses:
 FRANCIS P. CULLEN,
 H. C. NELSON.

Copies of this patent may be obtained for five cents each, by addressing the "Commissioner of Patents, Washington, D. C."